(12) United States Patent
Liu et al.

(10) Patent No.: US 12,441,544 B2
(45) Date of Patent: Oct. 14, 2025

(54) WAREHOUSE PICKING SYSTEM AND WAREHOUSE PICKING METHOD

(71) Applicant: Industrial Technology Research Institute, Hsinchu (TW)

(72) Inventors: Li-Yi Liu, Taipei (TW); Po-Yu Huang, Yunlin County (TW); Wei-Kang Liang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 913 days.

(21) Appl. No.: 17/583,223

(22) Filed: Jan. 25, 2022

(65) Prior Publication Data
US 2023/0211952 A1    Jul. 6, 2023

(30) Foreign Application Priority Data
Jan. 3, 2022 (TW) ................................. 111100045

(51) Int. Cl.
 *B65G 1/137* (2006.01)
 *G05D 1/00* (2024.01)
 (Continued)

(52) U.S. Cl.
 CPC ......... *B65G 1/1373* (2013.01); *G05D 1/0297* (2013.01); *G06Q 10/0875* (2013.01); *G06Q 50/40* (2024.01)

(58) Field of Classification Search
 CPC .............. B65G 1/1373; G05D 1/0297; G06Q 10/0875; G06Q 50/40; G06Q 10/08; G06Q 10/087; B07C 3/00; B07C 3/02
 See application file for complete search history.

(56) References Cited

U.S. PATENT DOCUMENTS

| 8,650,132 B2 | 2/2014 | McClurg |
| 10,572,854 B2 * | 2/2020 | Johnson ............. G06Q 10/0835 |

(Continued)

FOREIGN PATENT DOCUMENTS

| CA | 2816752 | 11/2013 |
| CN | 105469201 | 4/2016 |

(Continued)

OTHER PUBLICATIONS

"Office Action of Taiwan Counterpart Application", issued on Oct. 12, 2022, p. 1-p. 8.

(Continued)

*Primary Examiner* — Michael Collins
(74) *Attorney, Agent, or Firm* — JCIPRNET (57) ABSTRACT

A warehouse picking system and a warehouse picking method are provided. The warehouse picking system includes multiple cargo management stations and a management device. The management device receives multiple orders including at least one cargo, calculates an order score of each order by using an order score function; selects at least one order as a target order according to the order scores so as to determine a target cargo management station adapted for processing the target order; selects a cargo picking box storing at least one cargo in the target order from the cargo picking boxes of the target cargo management station to serve as candidate cargo picking boxes; and determines a target cargo picking box adapted for picking the cargo in the target order according to a workload of cargo picking equipment, a workload of cargo transportation equipment, and a disposition of each candidate cargo picking box.

20 Claims, 4 Drawing Sheets

(51) Int. Cl.
    *G06Q 10/0875*    (2023.01)
    *G06Q 50/40*     (2024.01)

(56)  References Cited

U.S. PATENT DOCUMENTS

| | | |
|---|---|---|
| 10,994,933 B2 * | 5/2021 | Johnson ............... B65G 1/1373 |
| 11,078,019 B2 * | 8/2021 | Johnson .................. B25J 5/007 |
| 2014/0100999 A1 * | 4/2014 | Mountz ............... G06Q 10/087 |
| | | 705/28 |
| 2016/0260158 A1 | 9/2016 | High et al. |
| 2019/0236525 A1 * | 8/2019 | Stanley ................. G06N 20/20 |
| 2020/0302391 A1 | 9/2020 | Li et al. |
| 2021/0073733 A1 | 3/2021 | Frye |
| 2024/0043216 A1 * | 2/2024 | Al .......................... G05D 1/667 |
| 2024/0351790 A1 * | 10/2024 | Wang ..................... B65G 1/137 |

FOREIGN PATENT DOCUMENTS

| | | |
|---|---|---|
| CN | 106311615 | 1/2017 |
| CN | 109978423 | 7/2019 |
| CN | 110599110 | 12/2019 |
| CN | 111027853 | 4/2020 |
| CN | 112387603 | 4/2021 |
| JP | 2005206281 | 8/2005 |
| WO | 2019223703 | 11/2019 |
| WO | 2020185081 | 9/2020 |

OTHER PUBLICATIONS

"Office Action of China Counterpart Application", issued on Jun. 25, 2025, p. 1-p. 9.

\* cited by examiner

| Order number | Order product | T | P | S | Order score from high to low |
|---|---|---|---|---|---|
| x0001 | p1 | 0.9 | 0.9 | 0.3 | 2.1 |
| x0002 | p4 | 0.9 | 0.88 | 0.2 | 1.98 |
| x0007 | p2,p3 | 0.7 | 0.5+0.6 | 0.1 | 1.9 |
| ⋮ | ⋮ | | | | |
| x0025 | p25 | 0.9 | 0.2 | 0.7 | 1.8 |
| x0029 | p29,p44 | 0.7 | 0.4+0.4 | 0.2 | 1.7 |
| x0032 | p32,p21 | 0.7 | 0.4+0.35 | 0.2 | 1.65 |
| ⋮ | ⋮ | | | | |

| Products required by order : a: 2, b: 1 | | | | | |
|---|---|---|---|---|---|
| Box number | Products in box | Picking equipment workload | Transportation equipment workload | Box transportation distance | Order product association number in box |
| 1 | a : 10 | 5 | 1 | 10 | 1 |
| 2 | c : 8, d : 2 | 2 | 0 | 3 | 0 |
| 3 | b : 12 | 0 | 2 | 5 | 1 |
| 4 | a : 5, b : 5 | 10 | 6 | 3 | 2 |
| 5 | e : 7, d : 1, f : 2 | 3 | 2 | 9 | 0 |
| 6 | d : 3 | 0 | 2 | 8 | 0 |
| 7 | a : 3, b : 7, c : 2 | 3 | 1 | 2 | 2 |
| 8 | c : 10 | 5 | 5 | 2 | 0 |

| Products required by order : a: 2, b: 1 | | | | | |
|---|---|---|---|---|---|
| Box number | Picking equipment workload score | Transportation equipment workload score | Box transportation distance score | Product association score in box | Total score |
| 1 | -0.021 | 0.145 | 0.000 | 0.063 | 0.186 |
| 3 | 0.250 | 0.020 | 0.125 | 0.063 | 0.457 |
| 4 | -0.046 | -0.064 | 0.175 | 0.125 | 0.190 |
| 7 | 0.012 | 0.145 | 0.200 | 0.125 | 0.482 |

FIG. 5

WAREHOUSE PICKING SYSTEM AND WAREHOUSE PICKING METHOD

CROSS-REFERENCE TO RELATED APPLICATION

This application claims the priority benefit of Taiwan application serial no. 111100045, filed on Jan. 3, 2022. The entirety of the above-mentioned patent application is hereby incorporated by reference herein and made a part of this specification.

TECHNICAL FIELD

The disclosure relates to a warehouse picking system and a warehouse picking method.

BACKGROUND

In recent years, various manufacturers have been working in the field of smart storage. The operational efficiency of smart storage depends entirely on the algorithm of its own configuration. However, factors that affect the efficiency of smart storage include storage structure, equipment workload, turnover rate, shipment correlation, order specifications, capacity, weight, etc. There are a variety of different types of factors, and it is difficult to arrive at a best solution. A wrong configuration may lead to waste and idleness of resources.

Common warehousing problems include limited storage space, limited picking equipment, and too many orders. The warehousing problems affect delivery time, resulting in a delay of several days. Under the influence of the pandemic, the delivery time may even last for one to several months. This situation not only causes loss due to a large number of delays in delivery, but also affects the quantity of new orders.

In the context of a sharp rise of global logistics orders, rising labor costs, and the impact of the epidemic, the picking algorithm used in a warehouse is key to achieve success among different smart warehouses.

SUMMARY

The warehouse picking system of the disclosure includes multiple cargo management stations and a management device. Each of the cargo management stations includes multiple cargo picking boxes, multiple pieces of cargo picking equipment, and multiple pieces of cargo transportation equipment. Each of the cargo picking boxes stores at least one cargo. The cargo picking equipment is used to pick the cargo in the cargo picking box. The cargo transportation equipment is used to transport the cargo picked by cargo picking equipment. The management device includes a processor and a communication device used to communicate with each of the cargo management stations. The processor is configured to: receive multiple orders, wherein each of the orders includes the at least one cargo; calculate an order score of each of the orders by using an order score function, and select at least one of the orders as a target order according to the order score to determine a target cargo management station adapted for processing the target order from the cargo management stations; select at least one cargo picking box storing the at least one cargo in the target order from the cargo picking box of the target cargo management station as candidate cargo picking boxes; and determine at least one target cargo picking box adapted for picking the cargo of the target order according to a workload of the cargo picking equipment for picking the cargo in the cargo picking box, a workload of the cargo transportation equipment for transporting the cargo, and a disposition of each of the candidate cargo picking boxes.

The warehouse picking method of the disclosure is adapted for a management device having a processor and a communication device. The management device communicates with multiple cargo management stations through the communication device. Each of the cargo management stations includes multiple cargo picking boxes for storing at least one cargo, multiple pieces of cargo picking equipment for picking the cargo in the cargo picking box, and multiple pieces of cargo transportation equipment for transporting the cargo picked by the cargo picking equipment. The method includes the following. Multiple orders are received, and each of the orders includes the at least one cargo. An order score of each of the orders is calculated by using an order score function, and at least one of the orders is selected as a target order according to the order score to determine a target cargo management station adapted for processing the target order from the cargo management stations. At least one cargo picking box storing the at least one cargo in the target order is selected from the cargo picking box of the target cargo management station as candidate cargo picking boxes. At least one target cargo picking box adapted for picking the cargo of the target order is determined according to a workload of the cargo picking equipment for picking the cargo in the cargo picking box, a workload of the cargo transportation equipment for transporting the cargo, and a disposition of each of the candidate cargo picking boxes.

To provide a further understanding of the above features and advantages of the disclosure, embodiments accompanied with drawings are described below in details.

DESCRIPTION OF THE EMBODIMENTS

An embodiment of the disclosure proposes an optimal picking planning algorithm. After taking into account the order, product information, and picking equipment operation information in a warehouse, the optimal picking planning algorithm performs grouping in order to distribute similar orders to corresponding cargo management stations according to the product data in the orders. Next, each cargo management station calculates the position of a product box in the current warehouse and the status of the work equipment according to the assigned order, so as to calculate optimal picking planning. Finally, the desired product is picked from a determined cargo picking box. In this way, the picking planning may be calculated efficiently, the picking quantity may be maximized, and the time required to complete the order may be minimized. In addition, the cargo picking volume of the entire plant may be greatly increased without increasing manpower and equipment resources.

Figure 1:
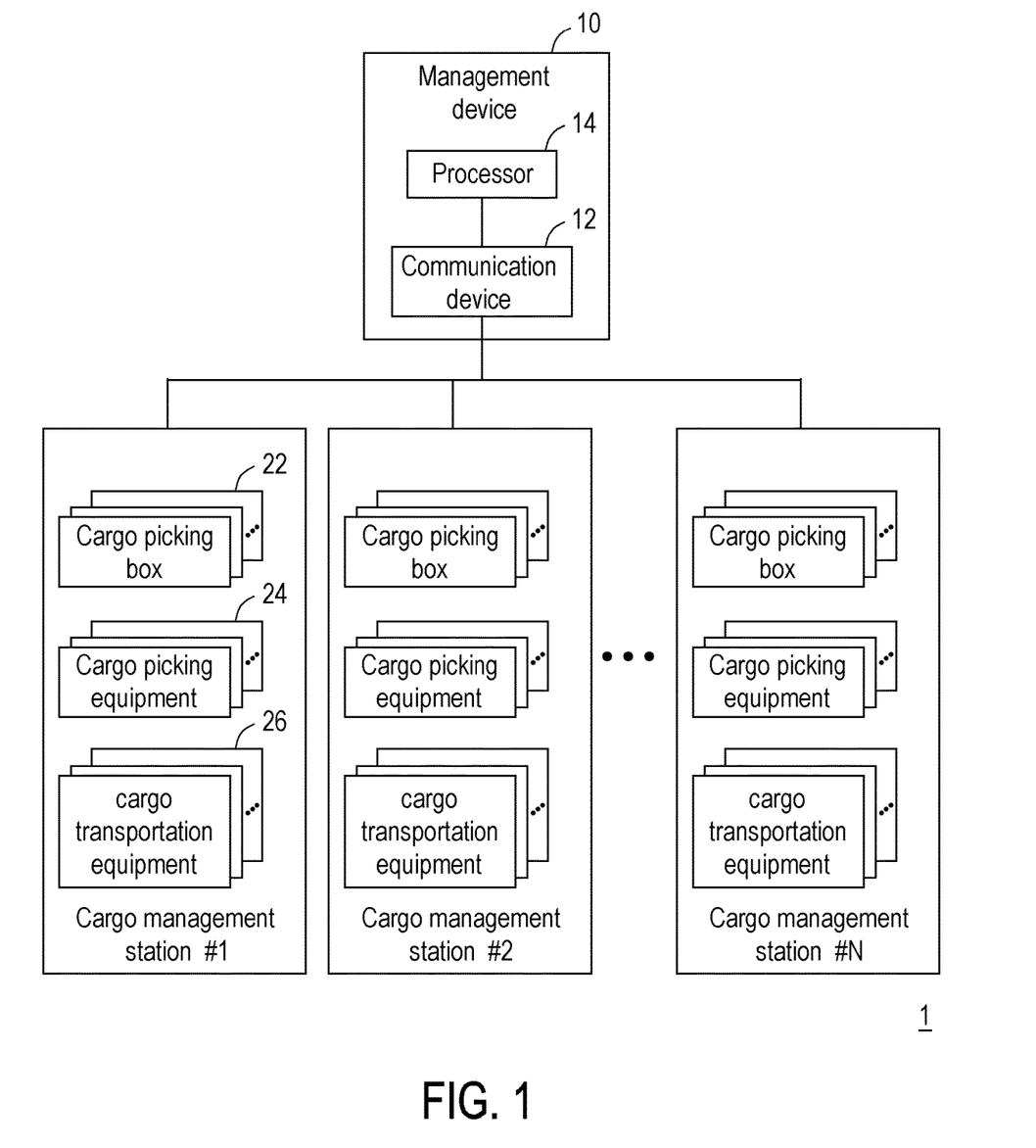
FIG. 1 is a schematic diagram of a warehouse picking system according to an embodiment of the disclosure.

FIG. 1 is a schematic diagram of a warehouse picking system according to an embodiment of the disclosure. Referring to FIG. 1, a warehouse picking system 1 includes N cargo management stations #1 to #N and a management device 10, where N is a positive integer. Each of the cargo management stations #1 to #N includes a plurality of cargo picking boxes, a plurality of pieces of cargo picking equipment, and a plurality of pieces of cargo transportation equipment. The cargo picking equipment is, for example, a robotic arm or a radio shuttle system, and the cargo transportation equipment is, for example, an automated guided vehicle, a conveyor, a pallet truck, or a mobile rack, but the embodiment is not limited thereto.

Take the cargo management station #1 as an example, the cargo management station #1 includes storing a plurality of cargo picking boxes 22 with at least one cargo, a plurality of pieces of cargo picking equipment 24 for picking cargos in the picking boxes 22, and a plurality of pieces of cargo transportation equipment 26 for transporting cargos picked by the cargo picking equipment 24. The management device 10 includes a communication device 12 and a processor 14.

The communication device 12 is, for example, a wireless communication device that supports the communication protocol of wireless fidelity (Wi-Fi), RFID, Bluetooth, infrared, near-field communication (NFC), or device-to-device (D2D), etc. In some embodiments, the communication device 12 is, for example, a network card that supports a wired network connection such as Ethernet or a wireless network card that supports a wireless communication standard such as Institute of Electrical and Electronics Engineers (IEEE) 802.11n/b/g. The communication device 12 may communicate with the cargo management stations #1 to #N via a wired or wireless method.

The processor 14 is, for example, a central processing unit (CPU), or other programmable general-purpose or special-purpose devices such as a microprocessors, a digital signal processor (DSP), a programmable controller, an application specific integrated circuit (ASIC), a field programmable gate array (FPGA), and a programmable logic controller (PLC), or other similar devices or a combination of these devices, and is used to control the operation of the management device 10, and may load and execute a computer program to implement a warehouse picking method of an embodiment of the disclosure.

Figure 2:
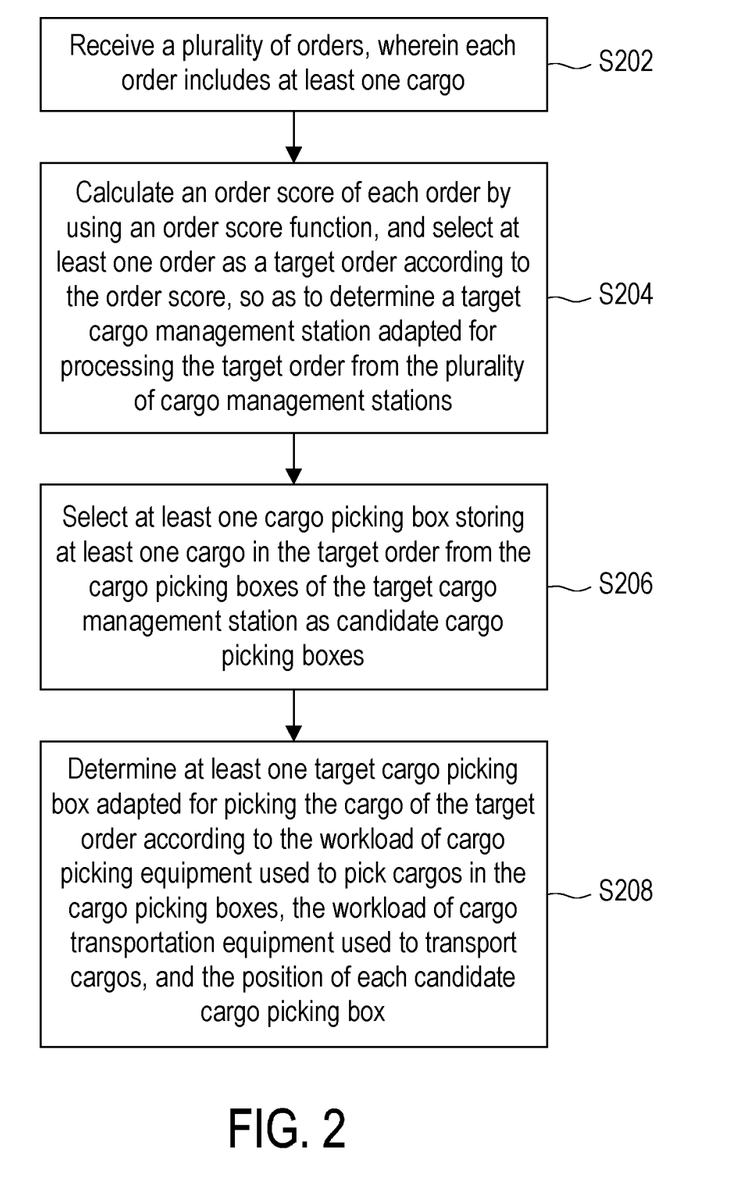
FIG. 2 is a flow chart of a warehouse picking method according to an embodiment of the disclosure.

FIG. 2 is a flow chart of a warehouse picking method according to an embodiment of the disclosure. Referring to FIG. 1 and FIG. 2, the method of this embodiment is applicable to the warehouse picking system 1 of FIG. 1. The following is the detailed steps of the warehouse picking method of the disclosure in connection with the elements of the warehouse picking system 1.

In step S202, the processor 14 receives a plurality of orders, and each order includes at least one cargo. The processor 14 selects, for example, the top n orders from M orders in an order pool of the management device 10 as orders to be processed according to the time or importance of the orders, where M and n are positive integers. The orders in the order pool is, for example, the orders received by the processor 14 from an external device through the communication device 12 or the orders entered by a warehouse manager at the local end, and the disclosure is not limited thereto.

In step S204, the processor 14 calculates an order score of each order by using an order score function, and selects at least one order as a target order according to the order scores, so as to determine a target cargo management station adapted for processing the target order from the plurality of cargo management stations (the cargo management stations #1 to #N in FIG. 1). In an embodiment, the order score function includes an order content function, a product information function, and an order schedule function, and the order score is the weighted sum of the function values of the order content function, the product information function, and the order schedule function. In other embodiments, the order score function may further include other functions. This embodiment does not limit the type and number of functions included therein.

In an embodiment, the order content function is the ratio of the order product number of each order to a largest order product number in the order pool. The product information function is the ratio of the distance from the order product of each order to the exit to a longest distance between a product and the exit. The order schedule function is the ratio of the order establishment time of each order to the time already spent processing the order.

For example, assuming that the order content function is T, the product information function is P, and the order schedule function is S, the formula for calculating the order score $O(m)$ of the m-th order among the extracted n orders is as follows:

$$O(m)=tT+pP+S \quad (1)$$

In Formula (1), t and p are coefficients, and their values may be adjusted according to actual needs, and the disclosure is not limited thereto.

Figure 3:
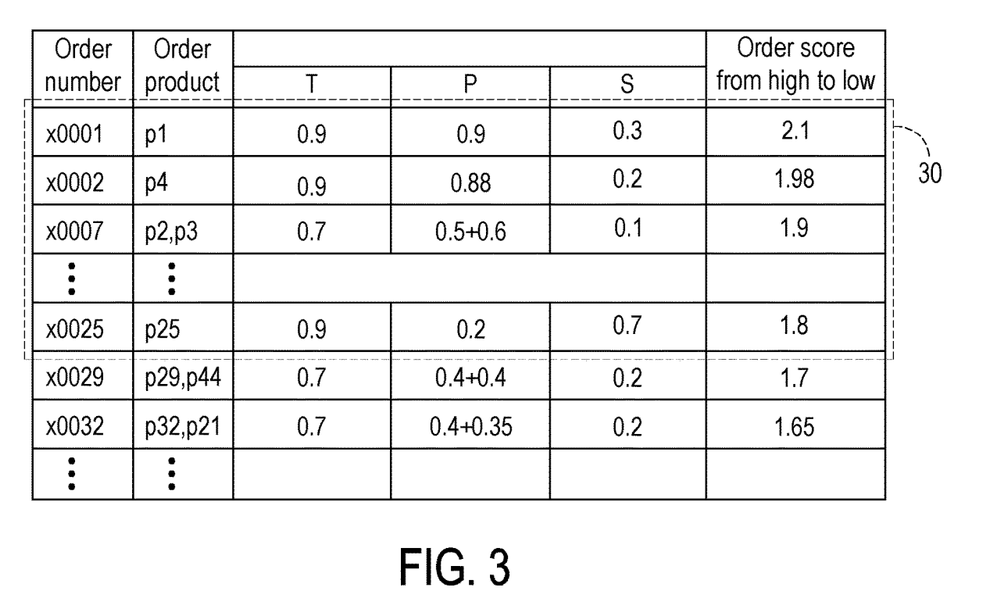
FIG. 3 is a schematic diagram of determining a target cargo management station responsible for a target order according to an embodiment of the disclosure.

FIG. 3 is a schematic diagram of determining a target cargo management station responsible for a target order according to an embodiment of the disclosure. Referring to FIG. 3, a plurality of orders received by a management device of this embodiment include order x0001 (including cargo p1), order x0002 (including cargo p4), order x0007 (including cargo p2 and p3), . . . , order x0025 (including cargo p25), order x0029 (including cargo p29 and cargo p44), and order x0032 (including cargo p32 and cargo p21), etc.

In the above Formula (1), the order content function T may be: the product number of this order/the largest order product number in the order pool, and the product information function P may be: the distance from the order product to the exit/the longest distance from the product to the exit, and the order schedule function S may be: the order establishment time/time already spent.

In an embodiment, since the number of cargos included in order x0001 (including cargo p1; the number of cargos is 1) is less than the number of cargos included in order x0007 (including cargo p2 and cargo p3; the number of cargos is 2), order x0001 is easier to complete than order x0007. At this time, the value of order function T of order x0001 may be set to be greater than the value of order function T of order x0007.

In another embodiment, assuming that the distance from the position of cargo p1 (in order x0001) to the warehouse exit is less than the distance from the position of cargo p4 (in order x0002) to the warehouse exit, order x0001 is easier to complete than order x0002. At this time, the value of product information function P of order x0001 may be set to be greater than the value of product information function P of order x0002.

In another embodiment, assuming that the order establishment time of order x0001 is earlier than the order establishment time of order x0002, the management device may set the value of order schedule function S of order x0001 to be greater than the value of order schedule function S of order x0002.

After setting the values of order content function T, product information function P, and order schedule function S for each order received, the management device may calculate the order score of each order according to Formula (1), and sort these orders according to order scores.

In the example shown in FIG. 2, the management device may select a predetermined number (for example, 25) of orders from the sorted orders as the target orders 30, and determine a target cargo management station adapted for being responsible for these target orders, so as to assign these target orders to the target cargo management station to instruct the target cargo management station to be responsible for picking and transportation of cargos in the orders.

Referring back to the process in FIG. 2, after determining the target cargo management station, the management device 10 may further determine the cargo picking box to pick cargos from.

Specifically, in step S206, the processor 14 selects at least one cargo picking box storing at least one cargo in the target order from a plurality of cargo picking boxes of the target cargo management station as candidate cargo picking boxes.

Figure 4:
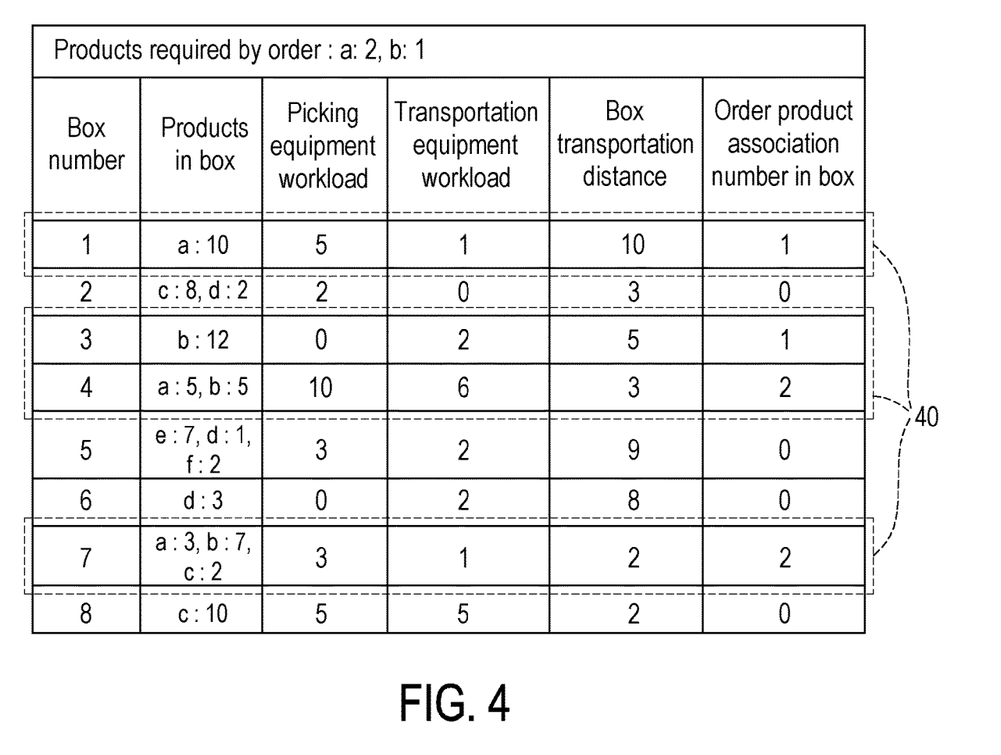
FIG. 4 is a schematic diagram of determining a candidate cargo picking box according to an embodiment of the disclosure.

For example, FIG. 4 is a schematic diagram of determining the candidate cargo picking box according to an embodiment of the disclosure. Referring to FIG. 4, this embodiment assumes that the target cargos included in the target order are 2 cargos a and 1 cargo b, and assumes that cargo picking boxes 1 to 8 are included in the target cargo management station.

The management device may determine a plurality of candidate cargo picking boxes from the cargo picking boxes 1 to 8. As shown in FIG. 4, since 10 cargos a included in the cargo picking box 1 may be used to complete the target order (may pick from the cargo picking box 1 to complete 2 cargos a in the target cargo), the management device may determine the cargo picking box 1 as the candidate cargo picking box. In addition, since 3 cargos a, 7 cargos b, and 2 cargos c included in the cargo picking box 7 may be used to complete the target order (may pick from the cargo picking box 7 to complete 2 cargos a and 1 cargo b in the target cargo), the management device may also determine the cargo picking box 7 as the candidate cargo picking box.

The result is shown as a mark 40 in FIG. 4. The management device may determine the cargo picking box 1 (including 10 cargos a), the cargo picking box 3 (including 12 cargos b), the cargo picking box 4 (including 5 cargos a, and 5 cargos b), and the cargo picking box 7 (including 3 cargos a, 7 cargos b, and 2 cargos c) as the candidate cargo picking boxes.

Referring back to the process of FIG. 2, in step S208, the processor may determine the target cargo picking box adapted for picking the cargo of the target order according to the workload of cargo picking equipment used to pick cargos in the cargo picking boxes, the workload of cargo transportation equipment used to transport cargos, and the disposition of each candidate cargo picking box. The disposition of the candidate cargo picking box includes the position (the distance to the warehouse exit) of the candidate cargo picking box and the correlation between the cargo existing therein and the target cargo, and the disclosure is not limited thereto.

In an embodiment, the processor 14 may calculate a first ratio of a first coefficient to the workload of the cargo picking equipment, a second ratio of a second coefficient to the workload of the cargo transportation equipment, a first product of the position of the candidate cargo picking box and a third coefficient, a second product of a correlation between the cargo picking box and the product in the order and a fourth coefficient, and calculate the sum of the first ratio, the second ratio, the first product, and the second product as a picking box score of each cargo picking box. Finally, according to the calculated picking box score of each cargo picking box, the processor 14 may determine the target cargo picking box adapted for picking the cargo of the target order.

For example, assuming that the current workload of the cargo picking equipment is A, the current workload of the cargo transportation equipment is B, the position of the cargo picking box is C, and the correlation between the cargo in the cargo picking box and the target cargo is D, the formula for calculating the score of the picking box is as follows:

$$\text{score} = a/A + b/B + cC + dD \quad (2)$$

In Formula (2), a, b, c, and d are coefficients, and their values may be adjusted according to the actual situation, and the disclosure is not limited thereto.

In an embodiment, if a manufacturer wants to set the workload of each cargo picking equipment to be more even, the manufacturer may set the value of parameter a to decrease when the workload A of a certain piece of equipment>the average workload $\overline{A}$ of all equipment. Conversely, the manufacturer may set the value of parameter a to increase when the workload A of a certain piece of equipment<the average workload $\overline{A}$ of all equipment.

In an embodiment, if the manufacturer wants to set the workload of each cargo transportation equipment to be more even, the manufacturer may set the value of parameter b to decrease when the workload B of a certain piece of equipment>the average workload $\overline{B}$ of all equipment. Conversely, the manufacturer may set the value of parameter b to increase when the workload B of a certain piece of equipment<the average workload $\overline{B}$ of all equipment.

In an embodiment, based on all scenarios, the closer a cargo picking box is to the shipping exit, the higher the score of the cargo picking box. If the manufacturer's warehouse processing speed is greatly affected by the distance between the box and the shipping exit, the value of parameter c may be increased. Otherwise, the parameter c may be set to a fixed value, such as 0.25.

In an embodiment, the parameter d is, for example, related to the mode of product placement in the warehouse. For example, if the placement mode of a product X is being scattered in a plurality of cargo picking boxes, then the number of boxes that meet this product condition is larger, and the value of parameter d may be set to a smaller value or a normal value. If the product X is placed in a small number of cargo picking boxes, there are fewer boxes that meet this product condition; at this time, the value of parameter d may be increased. An example is as follows:

$$d = 0.25 \times \text{number of orders that include a product}/\text{number of boxes that store this product} \quad (3)$$

Figure 5:
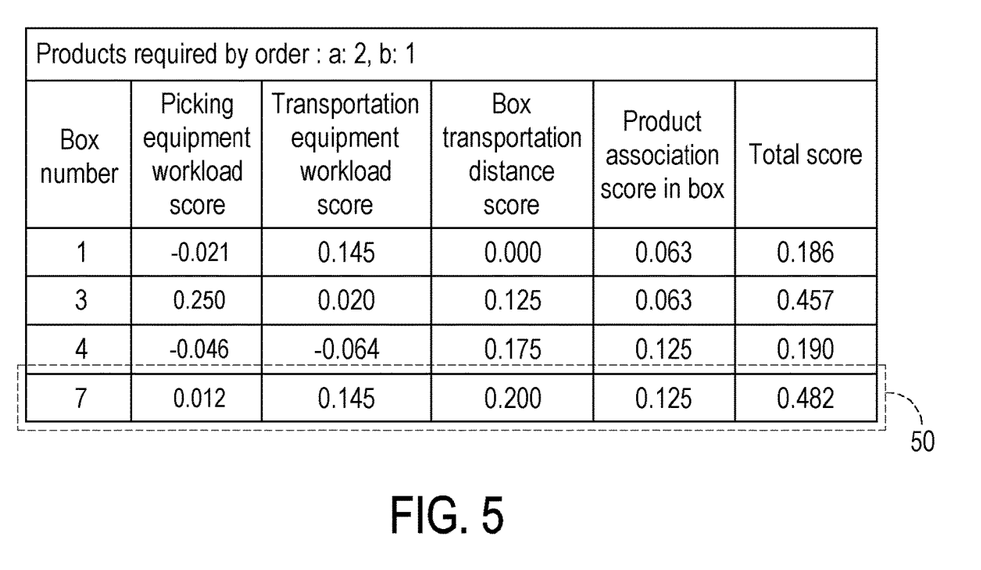
FIG. 5 is a schematic diagram of determining a target cargo picking box according to an embodiment of the disclosure.

For example, FIG. 5 is a schematic diagram of determining a target cargo picking box according to an embodiment of the disclosure. Referring to FIG. 4 and FIG. 5, this embodiment calculates a pick equipment workload score, a transportation equipment workload score, a box transportation distance score, and a correlation score of the product in the box of the candidate cargo picking boxes 1, 3, 4, and 7 determined in the embodiment of FIG. 4, and calculates a total score thereof according to Formula (2).

Since the picking box score of the candidate cargo picking box 7 calculated by using Formula (2) is greater than the picking box score of the candidate cargo picking boxes 1, 3, and 4, the management device may determine the candidate cargo picking box 7 as a target cargo picking box 50 (that is, picking cargos from the candidate cargo picking box 7 to complete the target order).

Finally, according to the determined target cargo picking box 50, the management device may determine the pieces of cargo picking equipment for picking cargos and the pieces of cargo transportation equipment for transporting cargos, thereby instructing the corresponding pieces of cargo picking equipment and cargo transportation equipment to perform cargo picking and transportation.

In an embodiment, the processor 14 may further calculate the weighted sum of the picking box score and at least one logistics score to determine the target cargo picking box adapted for picking the cargo of the target order.

For example, in a situation where a process other than the picking process is considered along with the picking process in picking goods, the picking box score may be multiplied by a preset weighting parameter. For example, considering the number of truck drivers sent to external supermarkets and supermarket locations and the scheduling process, a logistics score L may be calculated according to the above process, and the picking box score is multiplied by a preset weighting parameter f and then added with the logistics score L to obtain a final cargo picking score F as the basis for cargo picking. The formula is as follows:

$$F = f \times \text{score} + L \quad (4)$$

In summary, the warehouse picking system and the warehouse picking method of the disclosure obtain the order score for all the orders in the order pool according to the weighted sum of the order content function, the product information function, and the order schedule function. An order picking priority obtained according to the order scores may be provided to the corresponding cargo management station. The warehouse picking system may find the candidate cargo picking box that meets the requirements of the order product from the cargo management station, calculate the picking box score according to the product content of each candidate cargo picking box and the workload of the equipment to which it belongs, find the optimal picking box disposition, and finally determine the picking task and transportation task according to the selected picking box. In this way, the cargo picking volume of the entire factory area may be greatly increased without increasing any manpower and equipment resources.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:

1. A warehouse picking system, comprising:
a plurality of cargo management stations, wherein each of the cargo management stations comprises:
a plurality of cargo picking boxes, wherein each of the cargo picking boxes stores at least one cargo;
a plurality of pieces of cargo picking equipment, picking the cargo in the cargo picking box;
a plurality of pieces of cargo transportation equipment, transporting the cargo picked by the cargo picking equipment; and
a management device, comprising a processor and a communication device for communicating with each of the cargo management stations, wherein the processor is configured to:
receive a plurality of orders, wherein each of the orders comprises the at least one cargo;
calculate an order score of each of the orders by using an order score function, and select at least one of the orders as a target order according to the order score to determine a target cargo management station adapted for processing the target order from the cargo management stations;
select at least one cargo picking box storing the at least one cargo in the target order from the cargo picking box of the target cargo management station as candidate cargo picking boxes; and
determine at least one target cargo picking box adapted for picking the cargo of the target order according to a workload of the cargo picking equipment for picking the cargo in the cargo picking box, a workload of the cargo transportation equipment for transporting the cargo, and a disposition of each of the candidate cargo picking boxes.

2. The warehouse picking system according to claim 1, wherein the order score function comprises an order content function, a product information function, and an order schedule function, and the order score is a weighted sum of function values of the order content function, the product information function, and the order schedule function.

3. The warehouse picking system according to claim 2, wherein the order content function is a ratio of an order product number of each of the orders to a largest order product number in an order pool.

4. The warehouse picking system according to claim 2, wherein the product information function is a ratio of a distance from an order product of each of the orders to an exit to a longest distance between a product and the exit.

5. The warehouse picking system according to claim 2, wherein the order schedule function is a ratio of an order establishment time of each of the orders to a time already spent processing the order.

6. The warehouse picking system according to claim 1, wherein the processor selects the top n orders from M orders in an order pool as the order to be processed, wherein M and n are positive integers.

7. The warehouse picking system according to claim 1, wherein the processor calculates a first ratio of a first coefficient to the workload of the cargo picking equipment, a second ratio of a second coefficient to the workload of the cargo transportation equipment, a first product of a position of the candidate cargo picking box and a third coefficient, and a second product of a correlation between the cargo picking box and a product in the order and a fourth coefficient, and calculates a sum of the first ratio, the second ratio, the first product, and the second product as a picking box score of each of the cargo picking boxes.

8. The warehouse picking system according to claim 1, wherein the processor further calculates a weighted sum of the picking box score and at least one logistics score to determine the target order picking box adapted for picking the cargo of the target order.

9. The warehouse picking system according to claim 7, wherein the processor determines the target cargo picking box adapted for picking the cargo of the target order according to the picking box score of each of the cargo picking boxes that is calculated.

10. The warehouse picking system according to claim 1, wherein the cargo picking equipment comprises a robotic arm or a shuttle, and the cargo transportation equipment comprises an automated guided vehicle (AGV), a conveyor, a pallet, or a mobile rack.

11. A warehouse picking method, adapted for a management device having a processor and a communication device, wherein the management device communicates with a plurality of cargo management stations through the communication device, each of the cargo management stations comprises a plurality of cargo picking boxes for storing at least one cargo, a plurality of pieces of cargo picking equipment for picking the cargo in the cargo picking box, and a plurality of pieces of cargo transportation equipment for transporting the cargo picked by the cargo picking equipment, and the method comprises the following:
  receiving a plurality of orders, wherein each of the orders comprises the at least one cargo;
  calculating an order score of each of the orders by using an order score function, and selecting at least one of the orders as a target order according to the order score to determine a target cargo management station adapted for processing the target order from the cargo management stations;
  selecting at least one cargo picking box storing the at least one cargo in the target order from the cargo picking box of the target cargo management station as candidate cargo picking boxes; and
  determining at least one target cargo picking box adapted for picking the cargo of the target order according to a workload of the cargo picking equipment for picking the cargo in the cargo picking box, a workload of the cargo transportation equipment for transporting the cargo, and a disposition of each of the candidate cargo picking boxes.

12. The warehouse picking method according to claim 11, wherein the order score function comprises an order content function, a product information function, and an order schedule function, and the order score is a weighted sum of function values of the order content function, the product information function, and the order schedule function.

13. The warehouse picking method according to claim 12, wherein the order content function is a ratio of an order product number of each of the orders to a largest order product number in an order pool.

14. The warehouse picking method according to claim 12, wherein the product information function is a ratio of a distance from an order product of each of the orders to an exit to a longest distance between a product and the exit.

15. The warehouse picking method according to claim 12, wherein the order schedule function is a ratio of an order establishment time of each of the orders to a time already spent processing the order.

16. The warehouse picking method according to claim 11, wherein receiving the orders comprises selecting the top n orders from M orders in an order pool as the order to be processed, wherein M and n are positive integers.

17. The warehouse picking method according to claim 11, wherein determining the at least one target cargo picking box adapted for picking the cargo of the target order according to the workload of the cargo picking equipment for picking the cargo in the cargo picking box, the workload of the cargo transportation equipment for transporting the cargo, and a position of each of the candidate cargo picking boxes comprises:
  calculating a first ratio of a first coefficient to the workload of the cargo picking equipment, a second ratio of a second coefficient to the workload of the cargo transportation equipment, a first product of a position of the candidate cargo picking box and a third coefficient, and a second product of a correlation between the cargo picking box and a product in the order and a fourth coefficient, and calculating a sum of the first ratio, the second ratio, the first product, and the second product as a picking box score of each of the cargo picking boxes.

18. The warehouse picking method according to claim 17, wherein determining the at least one target cargo picking box adapted for picking the cargo of the target order according to the workload of the cargo picking equipment for picking the cargo in the cargo picking box, the workload of the cargo transportation equipment for transporting the cargo, and the position of each of the candidate cargo picking boxes further comprises:
  calculating a weighted sum of the picking box score and at least one logistics score to determine the target order picking box adapted for picking the cargo of the target order.

19. The warehouse picking method according to claim 17, wherein determining the at least one target cargo picking box adapted for picking the cargo of the target order according to the workload of the cargo picking equipment for picking the cargo in the cargo picking box, the workload of the cargo transportation equipment for transporting the cargo, and the position of each of the candidate cargo picking boxes comprises:
  determining the target cargo picking box adapted for picking the cargo of the target order according to the picking box score of each of the cargo picking boxes that is calculated.

20. The warehouse picking method according to claim 11, wherein the cargo picking equipment comprises a robotic arm or a shuttle, and the cargo transportation equipment comprises an automated guided vehicle (AGV), a conveyor, a pallet, or a mobile rack.

* * * * *